United States Patent [19]

Ogura et al.

[11] Patent Number: 4,628,355
[45] Date of Patent: Dec. 9, 1986

[54] DIAGNOSTIC X-RAY APPARATUS

[75] Inventors: Ichiro Ogura; Motomu Suzuki, both of Otawara; Senzo Fujii, Nishinasuno; Michitaka Honda, Otawara, all of Japan

[73] Assignee: Tokyo Shibaura Denki Kabushiki Kaisha, Kawasaki, Japan

[21] Appl. No.: 527,553

[22] Filed: Aug. 29, 1983

[30] Foreign Application Priority Data

Aug. 28, 1982 [JP] Japan .................. 57-149775

[51] Int. Cl.[4] .......................... H05G 1/64; H04N 5/32
[52] U.S. Cl. ........................................ 358/111; 378/99
[58] Field of Search .................... 378/99, 100; 358/111

[56] References Cited

U.S. PATENT DOCUMENTS

| 3,894,181 | 7/1975 | Mistretta et al. | 358/111 |
| 4,157,572 | 6/1979 | Kennedy et al. | 358/111 |
| 4,204,225 | 5/1980 | Mistretta . | |
| 4,204,226 | 5/1980 | Mistretta . | |
| 4,393,402 | 7/1983 | Keyes et al. | 358/111 |
| 4,412,247 | 10/1983 | Horbaschek . | |
| 4,542,459 | 9/1985 | Riederer | 378/99 |

FOREIGN PATENT DOCUMENTS

| 0037722 | 10/1981 | European Pat. Off. . | |
| 0069229 | 1/1983 | European Pat. Off. | 378/99 |
| 0088520 | 8/1978 | Japan | 358/111 |
| 56-15184 | 4/1981 | Japan . | |

OTHER PUBLICATIONS

Nakashika et al., "Latest Diagnostic System for Circulatory Organs", Toshiba Review International Edition, No. 43, Jul.-Aug. 1969, pp. 24-29.

Primary Examiner—Craig E. Church
Assistant Examiner—Charles Wieland
Attorney, Agent, or Firm—Finnegan, Henderson, Farabow, Garrett & Dunner

[57] ABSTRACT

A diagnostic X-ray apparatus emitting pulsed X-ray radiation includes a processor for performing digital X-ray subtraction of a previous mask image from current images. The apparatus includes circuitry for digitization of the video signals from an image intensifier-TV chain, digital subtraction to obtain digital difference signals, and subsequent reconversion of the resultant digital difference video signals to analog signals. Pulsed X-ray exposures are performed during the blanking periods of the TV camera following which the television fields immediately following the pulsed X-ray exposure are scanned and read out, and are supplied to the processor for performing the digital X-ray subtraction.

6 Claims, 2 Drawing Figures

DIAGNOSTIC X-RAY APPARATUS

BACKGROUND OF THE INVENTION

1. Field of the Invention

This invention relates to a diagnostic X-ray and, more particularly, to a diagnostic X-ray apparatus utilizing a digital X-ray subtraction imaging technique.

2. The Prior Art

A digital X-ray subtraction imaging technique using an imaging intensifier-TV chain is described in U.S. Pat. Nos. 4,204,225 and 4,204,226. Each of these patents discloses a real-time digital X-ray subtraction imaging method and apparatus used in digital radiography or digital fluoroscopy technology. These digital X-ray subtraction imaging apparatus include an image intensifier, a TV camera whose output is converted into digital format, and an image processor incorporating two digital memories.

More specifically, U.S. Pat. No. 4,204,225 discloses that in carrying out the mask mode of this technology, a first memory system is preferably employed to integrate and store digital mask video signals by digitization of video signals from an image intensifier-TV chain during an initial mask time interval utilizing a relatively large number of television fields. A second memory system integrates ongoing digital video signals and provides an output of these integrated video signals from which the mask video signals delivered by the first memory system are subtracted. The resulting digital difference video signals are supplied to a digital-to-analog converter which provides corresponding analog difference video signals for display by a display device. Alternatively, the analog signals may be fed to a multiformat camera for making a selected number of radiogrphic exposures on a single film.

In the time interval difference mode disclosed in U.S. Pat. No. 4,204,226, a series of difference images is produced by integrating digital video signals over a series of successive time intervals, performing a series of subtractions between the sets of successive integrated video signals stored in the memories to produce a series of digital difference video signals, and then converting such digital difference video into visibly displayed difference images representing changes in the X-ray image during successive time intervals.

One advantage of digital radiography apparatus is its capability to perform angiography by means of intravenous injections instead of by intra-arterial catheter techniques with their higher risks. Still another advantage of digital radiography apparatus is its capability to provide improved low contrast detection, namely, to amplify subtle amounts of contrast media in arteries, leading to results better than those normally achievable by film methods. Another advantage of digital radiography apparatus employing pulsed X-rays is that significant loss of spatial resolution due to physiological motion can be prevented because the short radiation pulse for each image results in less loss of detail during fluoroscopy of moving objects.

In such digital radiography apparatus, however, the TV camera is read out during the exposure and then a predetermined number of frames are averaged to produce an image. At least one frame, and generally several frames, are required to allow the video signal level to stabilize. The start of the camera readout coincides with initiation of the pulsed X-ray exposure so that motion blurring of the integrated X-ray image is a potential problem if the patient moves during image acquisition. This effect is further aggravated by the charge time or log of the TV pickup tube.

Therefore, the readout TV frame of such an apparatus includes charges remaining on the target due to preceding pulsed X-ray exposures. Furthermore, the levels of contrast to be detected are extremely low due to using a low kVp X-ray beam for each pulsed exposure, and a high signal-to-noise ratio is required to obtain meaningful diagnostic data.

SUMMARY OF THE INVENTION

It is therefore an object of the present invention to overcome the above defects of prior art pulsed digital radiography apparatus by using an imaging intensifier-TV chain, and to provide new features to remove motion blurring in an acquisition image and to minimize significant loss of spatial resolution due to physiological motion.

Another object of this invention is to make the exposure time for each pulsed X-ray as short as possible, and to separate the effects of X-ray exposure from the TV camera readout which follows termination of the X-ray exposure.

It is yet another object of the invention to provide a pulsed digital radiography apparatus which integrates and stores the digital video signals by digitization of the desired video signals from an image intensifier-TV chain, and which uses a unique data processor for selectively writing the desired video signals into memories in response to an output from a control unit.

It is a further object of the invention to reduce the X-ray quantum noise determined by the level of exposure, and to improve the signal-to-noise ratio in a TV image by using a relatively high dose rate X-ray beam.

These and other objects are achieved according to the invention by providing a novel diagnostic X-ray apparatus emitting pulsed X-ray radiation with short exposure time which includes a processor for performing digital X-ray subtraction imaging including digitization of the video signals from an image intensifier-TV chain, digital subtraction, and reconversion of the resultant digital difference video signals to analog signals, wherein the TV camera is interrupted during the actual radiation exposure, and following the termination of the X-ray exposure the TV camera is turned on again and the picture information is readout and digitized.

In particular, according to the present invention, a diagnostic X-ray apparatus for producing visible difference images from X-ray images obtained from X-ray radiation, comprises: an X-ray generating source for emitting radiation to produce an X-ray image; television means, including a television camera having a predetermined field rate, for converting the X-ray image into a series of analog video signals; synchronizing means for generating field synchronizing signals at the field rate of the television camera; exposure control means coupled to the synchronizing means and the television means, and responsive to the field synchronizing signals for generating X-ray exposure signals to control the exposure time of the radiation emitted from the X-ray generating source, the exposure control means including means for generating a field blanking signal relative to the exposure timing of the X-ray generating source; analog-to-digital converting means coupled to the television means for converting the analog video signals from the television means, corresponding to a complete television image read out in a predetermined sequence after termination of the X-ray exposure signal, into corresponding digital video signals; a digital memory system coupled to the converting means and including means for storing the digital video signals in the predetermined sequence; subtracting means coupled to the digital memory system for producing digital difference video signals by performing a subtraction between digital video signals recently stored and digital video signals previously stored in the digital memory system; a digital-to-analog converter for converting said digital difference video signals from the subtracting means into analog difference video signals; and display means for producing visible difference images corresponding to the analog difference video signals.

BRIEF DESCRIPTION OF THE DRAWINGS

A more complete appreciation of the invention and many of the attendant advantages thereof can be understood by reference to the following detailed description when considered in connection with the accompanying drawings, wherein.

DESCRIPTION OF THE PREFERRED EMBODIMENTS

Figure 1:
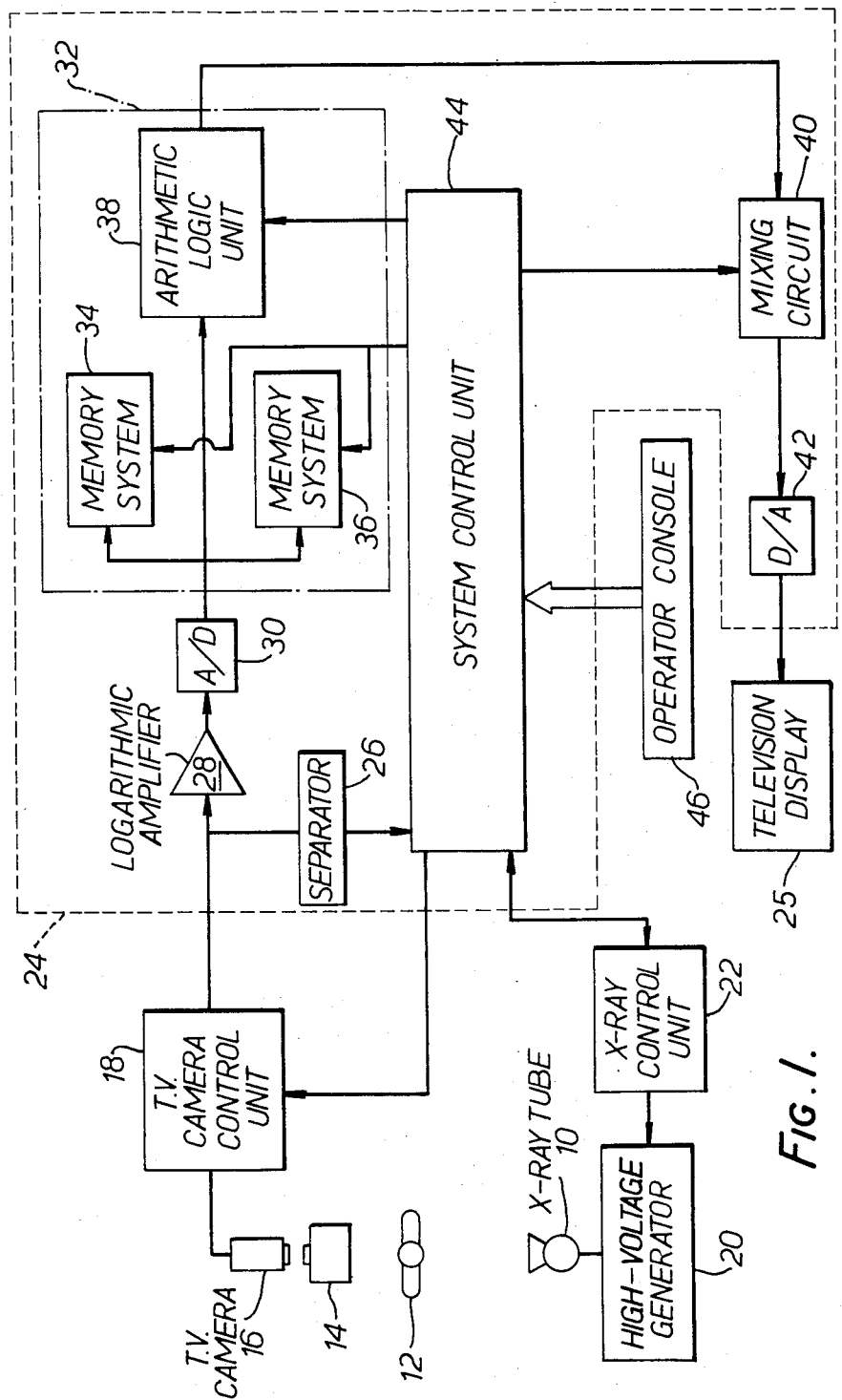
FIG. 1 is a schematic block diagram of a preferred embodiment of a diagnostic X-ray apparatus utilizing a digital X-ray subtraction imaging technique in accordance with the present invention.

FIG. 1 is a block diagram of an improved diagnostic X-ray apparatus utilizing a digital X-ray subtraction imaging technique in accordance with the present invention. In FIG. 1, an X-ray tube 10 having a conventional filament and anode produces X-rays which impinge on a patient 12, thus casting a shadow-image of the patient 12 on the input of an image intensifier tube 14. A collimator (not shown) controlled by a collimator servo system (not shown) is disposed between the X-ray tube 10 and the patient 12, and is utilized in a known fashion to control the size of the X-ray beam emitted from X-ray tube 10. The image intensifier tube 14 intensifies the X-ray image and produces a corresponding optical image on the output screen of intensifier 14. This image is scanned by a TV camera 16 via a known optical system (not shown) including an object lens, a field lens and an auto iris, for adjusting the quantity of light from intensifier 14 under the control of a TV camera control unit 18 in order to produce corresponding video signals on an output of unit 18.

A high voltage generator 20 serves to provide high voltage to energize the X-ray tube 10 under control of an X-ray control unit 22. The X-ray control unit 22 may energize the X-ray tube 10 to radiate pulsed X-rays either by a method using a thyristor switching system or a method using a tetrode switching system.

These methods have previously been described by Nakashima et al. in Toshiba Review International Edition, No. 43, July-Aug., 1969, pp. 24-29, which is incorporated herein by reference.

A contrast medium is preferably injected into the right basilic vein of the patient 12 using a high pressure injector (not shown) at a flow rate of 12 cc/sec. under control of the X-ray control unit 22. A data processor 24 for carrying out operations on the analog video signals from TV camera 16, including digitization, digital subtraction, contour enhancement and reconversion to analog signals, is connected to TV camera control unit 18. The X-ray control unit 22 is also connected to the data processor 24 for receiving television synchronizing pulses to synchronize the operation of the X-ray control unit 22 with the television fields. Data processor 24 provides the resulting analog difference video signals for display by a television display device 25.

The data processor 24 includes a separator 26 for separating field synchronizing pulses having a rate, preferably, of 1/60 sec. per field from composite video signals provided via the TV camera control unit 18, and for producing timing pulses having a rate, preferably, of 1/30 sec. (33 msec.) per field in accordance with one television frame consisting of two individual fields. A logarithmic amplifier 28 is also provided which is coupled to control unit 18 and is adapted to provide amplified output video signals proportional to the logarithm of the input video signal at a sufficiently high level for effective processing by the following digitization circuit.

Data processor 24 further includes an analog-to-digital converter 30 for converting analog video signals into corresponding digital video signals, a video image processor 32 including two memory systems 34, 36 for integrating and storing digital video signals over a series of successive time intervals, and an arithmetic logic unit 38 for enabling the memories 34, 36 to integrate and store digital video signals over a series of successive time intervals. Arithmetic logic unit 38 is also capable of producing digital difference video signals by performing a subtraction operation between the two sets of integrated digital video signals stored in memory systems 34 and 36. As explained in further detail hereinbelow, the subtraction operation preferably involves subtracting signals in the most recently filled memory system 36 from those stored in the previously filled memory system 34 during the time interval when the other memory system 36 is being filled, all in response to command signals initiated by the separator 26.

Data processor 24 further includes a mixing circuit 40 to which the difference video output from the arithmetic logic unit 38 is provided, and which also has applied thereto the horizontal and vertical synchronizing pulses. Mixing circuit 40 provides corresponding digital difference video signals to a digital-to-analog converter 42 for converting the digital difference video signals into analog difference video signals that are displayed on television display device 25.

Data processor 24 also includes a system control unit 44 containing a microcomputer (micro-cpu) for providing all of the control, timing and synchronizing pulses and signals for the entire system, and an X-ray control interface (not shown) serving as a controller for X-ray control unit 22 from which X-ray radiation pulses are delivered. The X-ray control interface is also coupled to system control unit 44 and further receives timing pulses from the separator 26. The X-ray source 10 may be provided with a predetermined high voltage by high-voltage generator 20 under the control of X-ray control unit 22.

The micro-cpu of system control unit 44 is programmed to perform a digital X-ray subtraction imaging operation in a predetermined sequence in response to command signals. The relevant command signals include signals which either mark or occur synchronously with periods such as the mask time interval, the frame blanking time for interrupting the scanning of the TV camera 16, the X-ray exposure time, the waiting interval, and the image acquisition rate selected corresponding approximately to the frame rate, all of which are initiated from an operator console 46. Programming techniques able to accomplish these operations are known in the art.

The operation of the apparatus according to the present invention will now be explained in detail with reference to FIG. 2.

Figure 2:
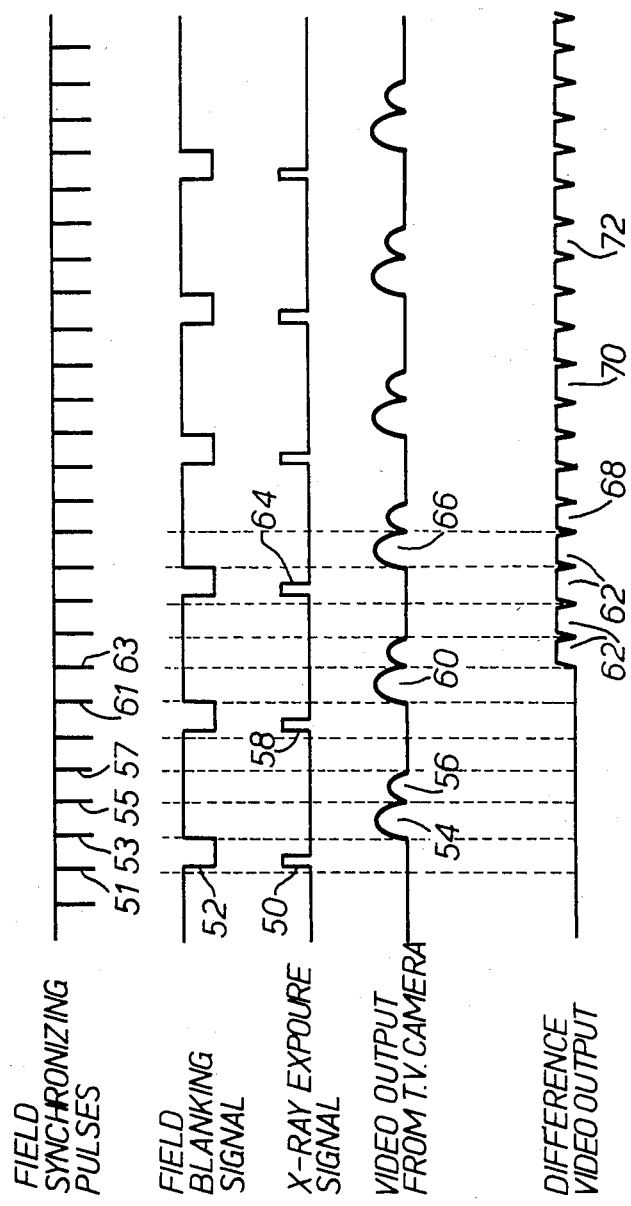
FIG. 2 is a timing diagram showing the operation of the apparatus according to this invention.

FIG. 2 represents a method that is the so-called mask mode technique, in which a series of difference images is produced by developing a pre-injection mask image prior to injection of the contrast medium, and electronically subtracting the mask image from the integrated series of post-injection images. This mask subtraction technique results in removal of the effects of soft tissue and bone or air-filled structures on the image so that the image elements due to the contrast medium are rendered more clearly visible. An alternative technique that may be used is the time interval difference method in which each set of integrated digital images is used as a mask for subsequent integrated digital images. The time interval difference method is particularly well adapted for visualizing the progress of a contrast mediuim injected into a peripheral portion of the cardiovascular system.

In the mask mode technique shown in FIG. 2, X-ray control unit 22 provides X-ray exposure signals to high-voltage generator 20 that are synchronized with the television fields. The signals are provided in response to a timing signal generated by system control unit 44. According to a preferred embodiment, one X-ray exposure signal occurs for every four field synchronizing pulses 51 in the first even television field, and serves to energize high voltage generator 20 so as to produce an X-ray pulse on command at selected programmed time intervals. The duration of each X-ray pulse is, for example, 3–10 msec. shorter than each television field duration which corresponds to the interval between two field synchronizing pulses, 51 and 53.

Charge patterns representative of the X-ray images are stored on the image plate of TV camera 16 via intensifier 14. Under the control of system control unit 44, TV camera control unit 18 also provides to TV camera 16 a field blanking signal 52 having a blanking period corresponding to approximately one field duration. As shown in FIG. 2, field blanking signal 52 is synchronized with X-ray exposure signal 50, with a delay time between field synchronizing pulse 51.

During the time between the leading edge of the field blanking signal 52 and the next field synchronizing pulse, such as the one marked 53, TV camera 16 is blanked under the control of unit 18 so the image plate of the TV camera 16 serves as a temporary image storage element. Immediately after termination of the instant X-ray exposure, the image stored on the image plate of TV camera 16 is scanned or read out simultaneously in the interlaced scan mode so that the resulting video output signal, such as the one marked 54, corresponding to the odd field immediately following the first X-ray exposure signal 50, i.e., the interval betweeen field synchronizing pulses 53, 55, is supplied through camera control unit 18 to logarithmic amplifier 28. This video output signal 54 represents only the X-ray image charged by i.e., resulting from, the first X-ray exposure signal 50.

The exposure time of the X-ray emission is preferably limited to be as short as possible so that the images corresponding to the fields immediately following the X-ray exposure are free blurring due to patient motion. Inherent characteristics of the TV camera, such as attenuation of the residual image of the image plate, cause the level of the video output signal of the second field image 56 (corresponding to the interval between field synchronizing pulses 55 and 57) to decrease to 70 percent of that of the first field image 54 immediately after the X-ray exposure. The one complete television field image 54 of a sufficiently high level produced by the first X-ray exposure signal 50 is delivered via logarithmic amplifier 28 to analog-to-digital converter 30. Analog-to-digital converter 30 in turn applies corresponding digital video signals to arithmatic logic unit 38 and to mask producing memory system 34 in which an image, ultimately serving as a mask for the subtraction operation is made before injection of the contrast medium.

After this has occurred, an X-ray contrast medium is injected into one of the veins in an arm or leg of the patient 12 at a specified time such that, based upon the flow rate of the medium through the patient, the contrast medium appears in the vascular area of interest in the subsequent X-ray image during a predetermined time interval. X-ray tube 10 is then again energized by high-voltage generator 20 to produce the second X-ray exposure signal 58 at the above-mentioned rate in response to a timing signal initiated from system control unit 44. The system control unit 44 then causes second memory system 36 to store the incoming digital video signals corresponding to field image 60 which occurs in the interval between field synchronizing pulses 61 and 63 immediately following second X-ray exposure signal 58. Field image 60 is at a sufficiently high level in the same manner as the mask image, i.e., field image 54.

The mask image in first memory system 34 is then subtracted from the integrated subsequent video signals in second memory system 36 by arithmetic logic unit 44. The digital difference video signals produced at the output of arithmetic logic unit 38 are supplied to mixing circuit 40, which also has applied thereto horizontal and vertical synchronizing pulses generated by a synchronizing signal generator (not shown) incorporated in system control unit 44. The digital composite video output from mixing circuit 40 is supplied to digital-to-analog converter 42 for conversion into corresponding analog video signals which are transmitted to television display device 25. As shown in FIG. 2, television display device 25 produces a series of visible difference images 62, 68, 70 and 72 representing the difference between each current X-ray image 60, 66 and the mask X-ray image 54. Television display device 25 continues to display the difference image over time intervals on the order of four television fields until the television field image immediately following the next X-ray exposure is completely read out.

Thus, successive subtraction operations are performed between the digital video signals derived during the television fields immediately following each X-ray exposure and the mask digital video signals stored in first memory system 34, so as to produce a series of successive digital difference video signals. According to a preferred embodiment of the invention, each X-ray pulse from X-ray tube 10 is generated at 60–80 kVp, 50–700 mA. To maintain short radiation pulses on the order of several msec, the current of each pulse can be varied from 50 to 700 mA as a function of kVp. The short pulse-width for each image results in less loss of detail during X-ray exposure of a moving patient.

It will be understood that the present invention can also be employed in the time interval difference mode in which sequential video fields separated by a selectable number of fields are subtracted from each other in order to form a display which shows short-term changes in contrast medium distribution.

It is noted that the field blanking signal for TV camera 16 may be utilized as a trigger signal to provide a blanking signal for intensifier 14 via system control unit 44, so as to scrub the overlapping images created by a long time response of an intensifier. This arrangement may also be employed to eliminate unnecessary images due to decay of the X-ray exposure relative the floating capacity of the power supply cable. Further, the auto iris for adjusting the quantity of light from the intensifier 14 may be used for the same purpose, so as to be closed synchronously with occurrence of the X-ray exposure signal except during the width of the X-ray exposure pulse.

Many variations of this mask mode procedure are possible in accordance with the present invention. For example, different digitized mask video signals can be stored and integrated in memory system 34 over a predetermined number of television fields immediately following the X-ray exposures. This produces a blurring of the mask represented by the integrated mask video signals. Using the blurred mask image can reduce significant misregistration errors introduced by patient motion, such as pulsations.

Alternatively, it is also possible to employ, according to the present invention, a TV camera tube having a progressive mode instead of an interlaced mode, which involves reading out an entire video frame of information in a single field. Since numerous modifications and variations of the present invention are possible in light of the above teachings, it is to be understood that within the scope of the appended claims, the invention may be practiced otherwise than as specifically described herein.

What is claimed is:

1. A diagnostic X-ray apparatus for producing visible difference images from X-ray images obtained from pulsed X-ray radiation, comprising:

an X-ray generating source for emitting pulsed X-ray radiation to produce a pulsed X-ray image;

television means, including a television camera having a predetermined field rate, for converting said X-ray image into a series of analog video signals;

synchronizing means for generating field synchronizing signals at the field rate of said television camera;

exposure control means reponsive to said field synchronizing signals for generating X-ray exposure signals to control the exposure period of the pulsed X-ray radiation emitted from said X-ray generating source, said exposure period being less than the interval of said field synchronizing signals, and said exposure control means including means for generating field blanking signal synchronously with the exposure period of said X-ray generating source;

analog-to-digital converting means for converting into digital video signals said analog video signals corresponding to a complete television field image resulting from said pulsed X-ray radiation and following said field blanking signals;

a digital memory system including means for storing said digital video signals in a predetermined sequence;

subtracting means for producing digital difference video signals by performing a subtraction between digital video signals recently stored and digital video signals previously stored in said digital memory system;

a digital-to-analog converter for converting said digital difference video signals from said subtracting means into analog difference video signals; and display means for producing visible difference images corresponding to said analog difference video signals.

2. The apparatus of claim 1 wherein said analog-to-digital converting means causes conversion of said analog video signals corresponding to the complete television field image immediately following each of said X-ray exposure signals.

3. The apparatus of claim 2, wherein said exposure control means generates said X-ray exposure signals so as to control said exposure period of the X-ray radiation within a blanking period of said television camera resulting from said field blanking signals.

4. The apparatus of claim 3, wherein said blanking signals are coupled to the television camera and individually have a duration approximately corresponding to the time interval between two successive field synchronizing signals, and said X-ray generating source emits X-ray radiation having a pulse duration less than said blanking period.

5. The apparatus of claim 4, wherein said digital memory system includes at least two digital memory means for storing said digital video signals in said predetermined sequence.

6. The apparatus of claim 5, wherein said display means continues to display the same difference image as the result of said subtraction until termination of image acquisition by a successive X-ray exposure from said X-ray generating source.

* * * * *